United States Patent
Alpert et al.

(10) Patent No.: US 9,025,885 B2
(45) Date of Patent: May 5, 2015

(54) METHOD OF DETECTING GLOBAL MOTION AND GLOBAL MOTION DETECTOR, AND DIGITAL IMAGE STABILIZATION (DIS) METHOD AND CIRCUIT INCLUDING THE SAME

(71) Applicant: Samsung Electronics Co., Ltd, Gyeonggi-do (KR)

(72) Inventors: Sharon Alpert, Ramat-Gan (IL); Yowon Jeong, Gyeonggi-do (KR); Omri Govrin, Ramat-Gan (IL)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 141 days.

(21) Appl. No.: 13/830,631

(22) Filed: Mar. 14, 2013

(65) Prior Publication Data

US 2013/0322766 A1 Dec. 5, 2013

(30) Foreign Application Priority Data

May 30, 2012 (KR) .................. 10-2012-0057565

(51) Int. Cl.
*G06K 9/48* (2006.01)
*H04N 19/527* (2014.01)
*H04N 19/513* (2014.01)
*H04N 19/176* (2014.01)
*H04N 19/196* (2014.01)

(52) U.S. Cl.
CPC .............. *G06K 9/481* (2013.01); *H04N 19/176* (2014.01); *H04N 19/527* (2014.01); *H04N 19/198* (2014.01); *H04N 19/521* (2014.01)

(58) Field of Classification Search
CPC ..................................................... G06K 9/481
USPC .......... 382/197, 236, 253; 348/208.99, 208.4, 348/208.13; 375/240.16
See application file for complete search history.

(56) References Cited

U.S. PATENT DOCUMENTS 5,943,445 A * 8/1999 Dufaux .......................... 382/236
6,310,920 B1 * 10/2001 Ogawa ..................... 375/240.17
(Continued)

FOREIGN PATENT DOCUMENTS

JP 2004007804 1/2004
JP 2007142521 6/2007
(Continued)

OTHER PUBLICATIONS

John Y.A. Wang and Edward H. Adelson, "Layered Representation for Motion Analysis", M.I.T. Media Laboratory Vision and Modeling Group, Technical Report No. 221, Apr. 1993 Appears in Proceedings of the IEEE Computer Vision and Pattern Recognition Conference, pp. 361-366, New York, Jun. 1993.

*Primary Examiner* — Aaron W Carter
(74) *Attorney, Agent, or Firm* — F. Chau & Associates, LLC

(57) ABSTRACT

Disclosed is a global motion detecting method which includes receiving a video sequence of input images, calculating local motion vectors, one for each image block of a current input image, grouping image blocks of the current input image into image block groups, calculating a group motion parameter of each of the image block groups based on local motion vectors of the image blocks in each respective image block group, and determining a global motion parameter of the currently input image according to the group motion parameters.

18 Claims, 13 Drawing Sheets

(56) References Cited

U.S. PATENT DOCUMENTS

| | | |
|---|---|---|
| 6,415,056 B1 | 7/2002 | Boon |
| 7,551,673 B1* | 6/2009 | Oh et al. .................. 375/240.16 |
| 7,605,845 B2* | 10/2009 | Batur ........................ 348/208.6 |
| 7,649,549 B2* | 1/2010 | Batur ........................ 348/208.6 |
| 7,684,628 B2* | 3/2010 | Su et al. ..................... 382/236 |
| 7,783,076 B2* | 8/2010 | Tsunashima ................ 382/103 |
| 7,899,120 B2 | 3/2011 | Cho et al. |
| 7,929,613 B2 | 4/2011 | Kamijo et al. |
| 8,090,022 B2 | 1/2012 | Zhang |
| 8,120,661 B2* | 2/2012 | Rabinowitz et al. ....... 348/208.6 |
| 8,179,446 B2* | 5/2012 | Hong et al. ................ 348/208.6 |
| 8,488,010 B2* | 7/2013 | Voss et al. ................ 348/208.99 |
| 8,711,936 B2* | 4/2014 | Ito et al. .................. 375/240.16 |
| 8,771,189 B2* | 7/2014 | Ionasec et al. ............... 600/437 |
| 8,789,085 B2* | 7/2014 | Vilei .............................. 725/25 |
| 2001/0017890 A1* | 8/2001 | Rhee ...................... 375/240.16 |
| 2002/0118761 A1* | 8/2002 | Lee ........................ 375/240.27 |
| 2003/0081681 A1 | 5/2003 | Ghanbari et al. |
| 2003/0174775 A1* | 9/2003 | Nagaya et al. ........... 375/240.12 |
| 2006/0034528 A1* | 2/2006 | Su et al. ..................... 382/236 |
| 2006/0066728 A1* | 3/2006 | Batur ...................... 348/208.99 |
| 2007/0014432 A1* | 1/2007 | Tsunashima ................ 382/103 |
| 2007/0041445 A1 | 2/2007 | Chen et al. |
| 2007/0147506 A1 | 6/2007 | Kwon et al. |
| 2008/0060034 A1* | 3/2008 | Egnal et al. ................... 725/105 |
| 2008/0144716 A1 | 6/2008 | De Haan |
| 2008/0267292 A1* | 10/2008 | Ito et al. .................. 375/240.16 |
| 2009/0116732 A1* | 5/2009 | Zhou et al. ................... 382/154 |
| 2009/0220173 A1* | 9/2009 | Wajs .............................. 382/284 |
| 2009/0256918 A1* | 10/2009 | Rabinowitz et al. ....... 348/208.4 |
| 2009/0268819 A1 | 10/2009 | Nishida |
| 2010/0079606 A1* | 4/2010 | Batur ........................ 348/208.6 |
| 2010/0306793 A1* | 12/2010 | Vilei .............................. 725/25 |
| 2011/0103480 A1* | 5/2011 | Dane ...................... 375/240.16 |
| 2011/0176014 A1* | 7/2011 | Hong et al. ................ 348/208.4 |
| 2011/0193978 A1* | 8/2011 | Wu et al. ................... 348/208.6 |
| 2011/0254976 A1* | 10/2011 | Garten ...................... 348/229.1 |
| 2012/0069203 A1* | 3/2012 | Voss et al. ................. 348/208.1 |
| 2012/0093437 A1* | 4/2012 | Wajs .............................. 382/284 |
| 2012/0162449 A1* | 6/2012 | Braun et al. ............... 348/208.4 |
| 2012/0162454 A1* | 6/2012 | Park et al. .................. 348/208.6 |
| 2012/0189167 A1* | 7/2012 | Kurata et al. ................. 382/107 |
| 2012/0218442 A1* | 8/2012 | Jandhyala et al. ............ 348/239 |
| 2012/0269444 A1* | 10/2012 | Naito .......................... 382/197 |
| 2013/0033612 A1* | 2/2013 | Wu et al. ................... 348/208.6 |
| 2013/0050427 A1* | 2/2013 | Chou et al. ..................... 348/46 |
| 2013/0069935 A1* | 3/2013 | Liu et al. ....................... 345/419 |
| 2013/0083162 A1* | 4/2013 | Wang et al. .................... 348/43 |
| 2013/0093906 A1* | 4/2013 | Carlsson et al. .......... 348/208.99 |
| 2013/0322766 A1* | 12/2013 | Alpert et al. ................. 382/197 |

FOREIGN PATENT DOCUMENTS

| | | |
|---|---|---|
| JP | 2011172266 | 9/2011 |
| KR | 1020010072745 | 7/2001 |
| KR | 1020050108397 | 11/2005 |
| KR | 1020060036230 | 4/2006 |
| KR | 1020110045908 | 5/2011 |

* cited by examiner

METHOD OF DETECTING GLOBAL MOTION AND GLOBAL MOTION DETECTOR, AND DIGITAL IMAGE STABILIZATION (DIS) METHOD AND CIRCUIT INCLUDING THE SAME

CROSS-REFERENCE TO RELATED APPLICATIONS

A claim for priority under 35 U.S.C. §119 is made to Korean Patent Application No. 10-2012-0057565 filed May 30, 2012, in the Korean Intellectual Property Office, the entire contents of which are hereby incorporated by reference.

TECHNICAL FIELD

The inventive concept described herein relate to an image device, and more particularly, relate to a motion vector detecting method and a global motion detector of a digital image stabilization (DIS) method and circuit.

DISCUSSION OF THE RELATED ART

Images may enable information to be provided to the user via viewing. Images in a video sequence may be accompanied by sound, and the images may provide a higher information transfer characteristic compared with texts. The use of video captured by hand-held video capture devices may necessitate a technique of extracting motion information from video image sequences and correcting images therein using the extracted information. Digital cameras, digital video cameras and hand-held devices including such cameras are often employed to capture images or video while the camera is operated in the hand of a human operator. Thus, the video camera may be shaking or jittering in the operators hand while capturing the image or video. The jitter may be due to hand shaking or platform vibrations, and may include a horizontal component, a vertical component, a scaling component, and a rotational component. The jitter may make the hand-captured video distracting or disorienting for the viewer, and thus it is desirable to use digital circuits to digitally estimate camera trajectory (i.e., the jitter as detected between each pair of consecutive frames) and to filter out the jitter from a sequence of video frames of the same scene.

As an example of an image correcting technique, a digital image stabilization (DIS) technique has been proposed. The DIS technique may be used to correct an image moved or damaged due to a hand vibration in an image capturing device such as a digital camera. The global motion (camera trajectory) vector may be included in an affine transform parameters of the global motion compensation transform P(n) which are estimated between adjacent frames. The compensation transform P(n) may be an affine transform. In mathematics, affine geometry is the study of geometric properties which remain unchanged by affine transformations, i.e. non-singular linear transformations and translations. A mathematical system of equations defined by numerical coefficients, called an Affine matrix, has been developed to characterize the lateral (up/down), rotational, and scalar (e.g., zoom in or zoom out) of movement detected between each pair of consecutive frames or between portions thereof (e.g., moving objects in the frames). Thus, the compensation transform P(n) for compensating camera jitter may be characterized as the first Affine transform matrix related to any actually-stationary objects (e.g., rocks, tables, parked cars, mountains, the sun) in the scene. In almost all cases the handshake and platform vibrations may result in translation, rotation and scaling of video frames. To model all these, a six coefficient affine transform is required.

As another example of the image correcting technique, a frame rate conversion (FRC) technique has been proposed. With the FRC technique, an image sequence may be modified by converting an image sequence captured at a specific frame rate into an image sequence having a higher frame rate.

The DIS and FRC techniques may necessitate detecting the global motion parameter of each image in the video sequence. The global motion parameter indicates the direction of motion of a major portion of an image. In the DIS technique, the global motion parameter may indicate the direction of vibration. In the FRC technique, the global motion parameter may be used as information needed to generate intermediate images.

SUMMARY

An aspect of the inventive concept provides a global motion detecting method which comprises calculating the local motion vectors of image blocks of an input image, respectively; grouping the image blocks into image block groups (based on the calculated local motion vectors); calculating the group motion vector of each image block group based on the local motion vectors of its respective image blocks; and determining the global motion parameter of the input image according to the group motion vectors. In this application, the words "motion parameter" means the same thing as "motion vector" or affine transform coefficients comprising at least a translational motion vector. Each global motion parameter may also include coefficients indicating rotation.

In exemplary embodiments, the grouping the image blocks into image block groups comprises grouping the image blocks into the image block groups having the same size according to predetermined group size information.

In exemplary embodiments, the group motion vectors of the image block groups are calculated by performing random sample consensus based on a local motion vectors of the image blocks in the respective image block groups.

In exemplary embodiments, the determining the global motion parameter of the input image comprises: iteratively judging whether the difference between the group motion vectors of each pair of image block groups is larger than a threshold value; and if the difference between the group motion vectors of the two image block groups of the pair is smaller than the threshold value, then expanding the size of the image block groups such that image block groups, having a difference between group motion vectors below the threshold value, from among the image block groups are grouped into one image block group and calculating the group motion vector of the expanded image block group; and if the difference between the group motion vectors of the two image block groups of the pair is larger than the threshold value, then deciding the global motion parameter based on selecting one group motion vectors among the group motion vectors of the image block groups.

In exemplary embodiments, the judging whether the difference between the two group motion vectors of the pair of image block groups is larger than a threshold value comprises projecting a specific point of the input image onto a virtual image according to each of the two group motion vectors respectively; and comparing the distance between the two specific points, which are respectively projected onto the virtual image, with the threshold value.

In exemplary embodiments, the expanding of sizes of the image block groups is performed according to mean shift mode seeking.

In exemplary embodiments, the deciding the global motion parameter based on selecting one group motion vector from among the group motion vectors of the image block groups comprises projecting first feature points of the input image onto a virtual image according to the group motion vectors respectively; calculating a distance distribution between second points, which correspond to the first feature points respectively, of a previous image input prior to the input image and first points projected onto the virtual image; and selecting a group motion vector where a distribution of the calculated distance distribution over a first rate is below a first threshold value, as the group motion vector upon which the global motion parameter is based.

In exemplary embodiments, the first rate is 95%.

In exemplary embodiments, the global motion detecting method further comprises selecting a dominant motion vector of the group motion vectors of the image block groups when a difference between the group motion vectors of the image block groups is larger than the first threshold value.

In exemplary embodiments, the selecting the dominant motion vector comprises selecting a group motion vector where a distribution of the calculated distance distribution over the first rate is larger than the first threshold value and smaller than a second threshold value, as the dominant motion vector.

In exemplary embodiments, the global motion detecting method further comprises performing digital image stabilization of the input image based on the determined global motion parameter.

In exemplary embodiments, the global motion detecting method further comprises performing frame rate conversion of the input image based on the determined global motion parameter.

An aspect of the inventive concept provides a global motion detector comprising a local motion vector calculator which calculates local motion vectors of image blocks of an input image; a grouping unit which groups the image blocks into image block groups; an initial group size register which provides an initial size of the image block groups to the grouping unit; a random sample consensus calculator which calculates the group motion vector of each of the image block groups based on the local motion vectors of its respective image blocks; and a determination unit which determines the global motion parameter based on the group motion vectors.

In exemplary embodiments, if the difference between the two group motion vectors of a pair of image block groups is below a threshold value, then the two image blocks are grouped into the same image block groups. For example, the determination unit provides the grouping unit with new group size information including image block groups corresponding to group motion vectors having a difference smaller than the threshold value. The grouping unit regroups the image blocks into image block groups in response to the new group size information. The random sample consensus calculator recalculates group motion vectors of the regrouped image block groups.

In exemplary embodiments, if the difference between the two group motion vectors of a pair of image block groups is larger than a threshold value, then the determination unit projects feature points of the input image onto a virtual image according to the group motion vectors respectively, calculates the distance distribution between feature points of a previous image input prior to the input image and feature points projected onto the virtual image, and selects a group motion vector where a specific rate of the distance distribution is below a first threshold value, as the basis for the global motion parameter of the input image.

An aspect of the inventive concept provides a digital image stabilization (DIS) method for stabilizing a video image sequence, comprising: receiving a video sequence of input images; a global motion vector detecting method, wherein the global motion vector detecting method comprises: calculating the local motion vector of each image block of the current input image; grouping the image blocks into image block groups based on the calculated local motion vectors; calculating the group motion vector of each image block group among the image block groups based on the local motion vectors of its respective image blocks; and determining the global motion vector of the input image based on a selected one of the group motion vectors.

The grouping the image blocks into image block groups may comprise: initially grouping the image blocks into image block groups having the same size according to predetermined initial group size information; and iteratively expanding image block groups to include adjacent image block groups of initial group size, based on whether the differences between the two group motion vectors of each pair of image block groups is larger than a threshold value.

The digital image stabilization (DIS) method may further comprise: a global motion parameter calculating method, wherein the global motion parameter calculating method comprises: the global motion vector detecting method; and a method of measuring rotational motion in the video image sequence.

Exemplary embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of images, pixels, vectors, blocks, groups, and regions may be exaggerated for clarity.

It will be understood that, although the terms "first", "second", "third", etc., may be used herein to describe various elements, components, regions, vectors, groups, and/or sections, these elements, components, regions, blocks, vectors, groups, and/or sections should not be limited by these terms. These terms are only used to distinguish one element, component, region, blocks, vectors, groups, or section from another region, blocks, vectors, groups, or section. Thus, a first element, component, region, blocks, vectors, groups, or section discussed below could be termed a second element, component, region, blocks, vectors, groups, or section without departing from the teachings of the inventive concept.

It will be understood that the spatially relative terms are intended to encompass different orientations of the device in use or operation in addition to the orientation depicted in the figures. The device may be otherwise oriented (rotated 90 degrees or at other orientations) and the spatially relative descriptors used herein interpreted accordingly.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. As used herein, the term "and/or" includes any and all combinations of one or more of the associated listed items.

It will be understood that when an element or layer is referred to as being "connected to", "coupled to", or "adjacent to" another element, it can be directly connected, coupled, or adjacent to the other element, or intervening elements may be present. In contrast, when an element is referred to as being "directly on," "directly connected to", "directly coupled to", or "immediately adjacent to" another element, there are no intervening elements present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

BRIEF DESCRIPTION OF THE FIGURES

The above and other features will become apparent from the following description with reference to the following figures, wherein like reference numerals refer to like parts throughout the various figures unless otherwise specified, and wherein.

DETAILED DESCRIPTION OF EXEMPLARY EMBODIMENTS

Figure 1:
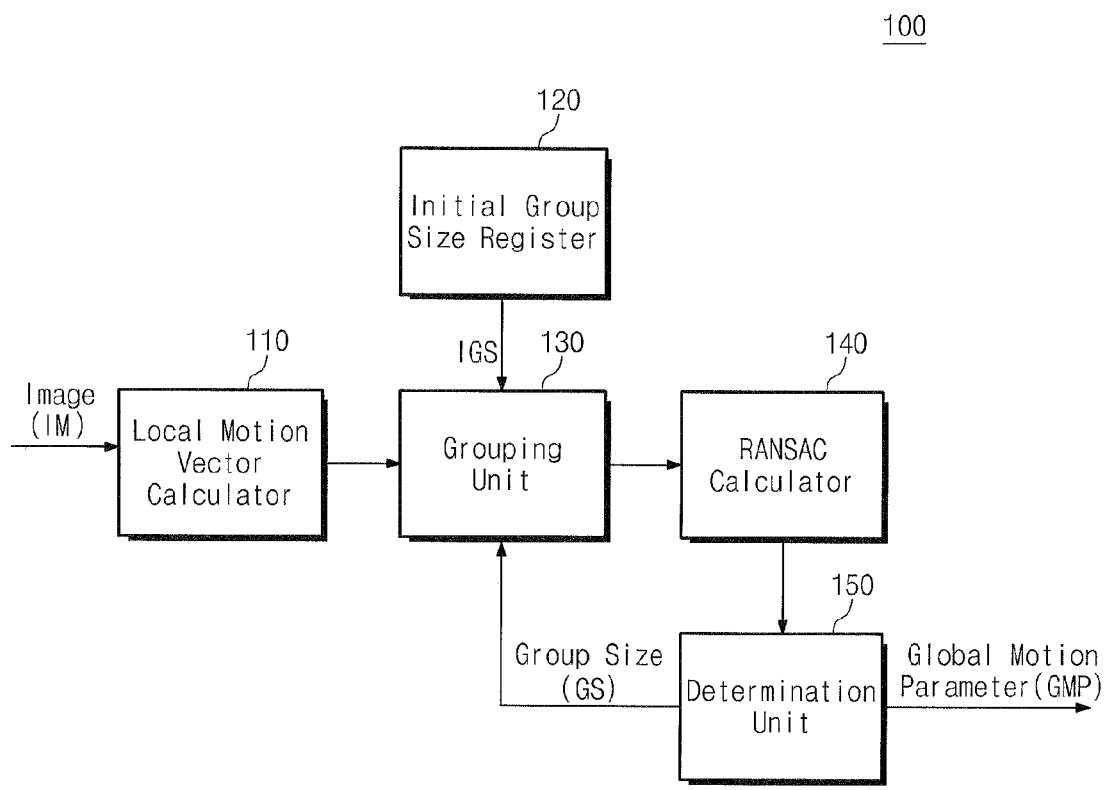
FIG. 1 is a block diagram schematically illustrating a global motion detector according to an embodiment of the inventive concept.

FIG. 1 is a block diagram schematically illustrating a global motion detector according to an exemplary embodiment of the inventive concept. Referring to FIG. 1, a global motion detector 100 may include a local motion vector calculator 110, an initial group size register 120, a grouping unit 130, a random sample consensus calculator 140, and a global motion determination unit 150.

The local motion vector calculator 110 divides each image IM among a video sequence into a plurality of image blocks, and calculates the local motion vector LMV of each image block. The local motion vector LMV indicates the directionality in which an image (or, a target object in the image) moves at an image block level by comparing a previously input image with a currently input image. The image blocks and local motion vectors are output to the grouping unit 130 from the local motion vector calculator 110.

The initial group size register 120 temporarily stores initial group size information IGS. The initial group size register 120 outputs the initial group size information IGS to the grouping unit 130.

The grouping unit 130 receives the image blocks and the associated local motion vectors LMV from the local motion vector calculator 110 and receives the initial group size information IGS from the initial group size register 120. The grouping unit 130 groups the image blocks according to the initial group size information IGS. For example, the grouping unit 130 may group the image blocks into a plurality of image block groups having the same size (e.g., a size corresponding to the initial group size information IGS) according to the initial group size information IGS. Information associated with the image block groups and logical motion vectors of image blocks thereof is transferred to the random sample consensus calculator 140.

The random sample consensus calculator 140 makes random sample consensus calculations based on local motion vectors LMV of image blocks in each image block group to calculate group motion parameters of the image block groups. The group motion parameter indicates the directionality in which an image (or, a target object in the image) moves at an image block level when a previously input image is compared with a currently input image. Information associated with the image block groups and group motion parameters thereof are output to the determination unit 150.

The global motion determination unit 150 determines the global motion parameter GMP based on information associated with the image block groups and the group motion parameters from the random sample consensus calculator 140. For example, the determination unit 150 may calculate the difference between group motion parameters. If the difference between group motion parameters is smaller than a threshold value, then the determination unit 150 may determine group size information GS such that the image block groups the difference of which is smaller than the threshold value are expanded into a new image block group. In response to the group size information, the grouping unit 130 may re-group image block groups, and the random sample consensus calculator 140 calculates group motion parameters of the image block groups. The above-described operations (constituting a loop) may be iterated until the difference between group motion parameters becomes larger than the threshold value.

If the difference between group motion parameters is larger than the threshold value, the determination unit 150 selects a group motion parameter satisfying a first condition, from among group motion parameters as the global motion parameter GMP of an input image IM. The global motion parameter GMP indicates at least two dimensional directionality in which an image (or, a camera capturing an image) moves at a specific image block level when a previously input image is compared with a currently input image.

If the difference between group motion parameters is larger than the threshold value, the global motion determination unit 150 may further select a group motion parameter, satisfying a second condition, from among group motion parameters as a dominant motion parameter. The dominant motion parameter may indicate directionality in which an image (or, a target object in the image) moves at a specific image block when a previously input image is compared with a currently input image.

Figure 2:
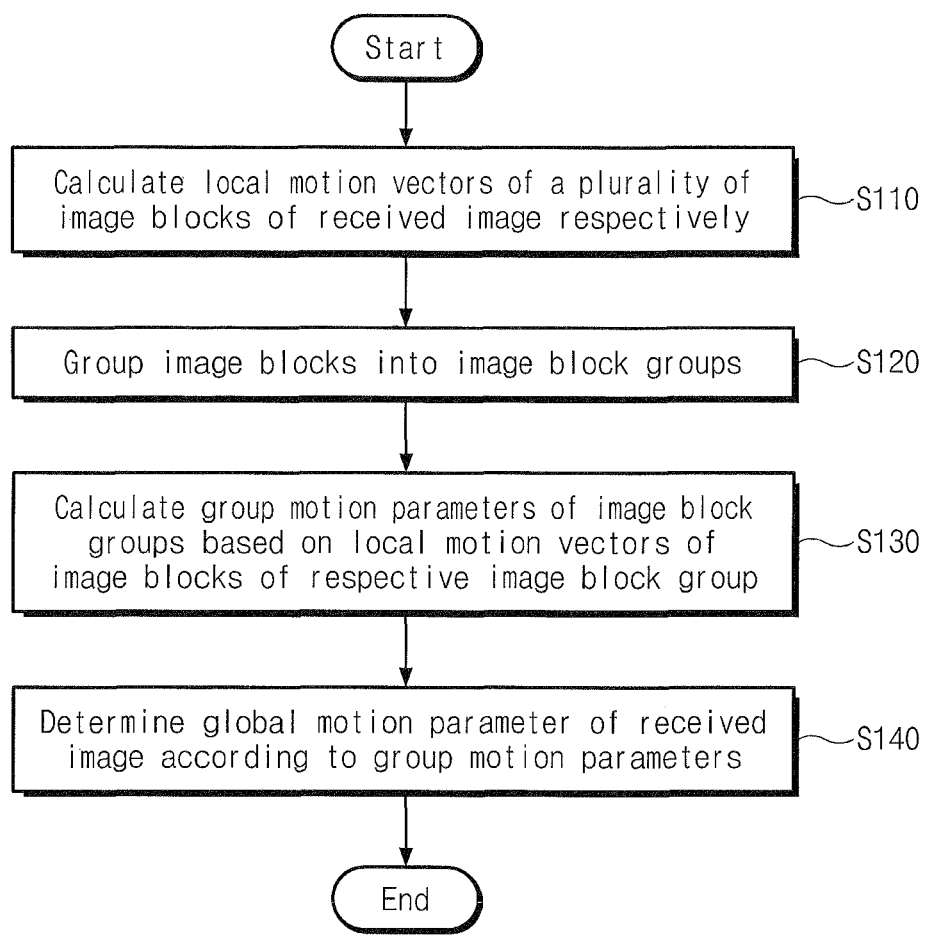
FIG. 2 is a flowchart illustrating a global motion detecting method of the global motion detector of FIG. 1.

FIG. 2 is a flowchart illustrating a global motion detecting method of the global motion detector of FIG. 1. Referring to FIGS. 1 and 2, in step S110, local motion vectors LMV of plural image blocks in an input image are calculated. A local motion vector calculator 110 calculates local motion vectors LMV of the plural image blocks.

In step S120, the image blocks are grouped into image block groups. A grouping unit 130 groups the image blocks into image block groups having the same size (e.g., corresponding to initial group size information IGS) based on the initial group size information IGS.

In step S130, group motion parameters of the image block groups are calculated using the local motion vectors LMV of the image blocks in each image block group. A random sample consensus calculator 140 calculates group motion parameters of the image block groups through random sample consensus calculation.

In step S140, the global motion parameter GMP of the input image is determined according to the group motion parameters. A determination unit 150 selects the global motion parameter GMP from among the group motion parameters.

Figure 3:
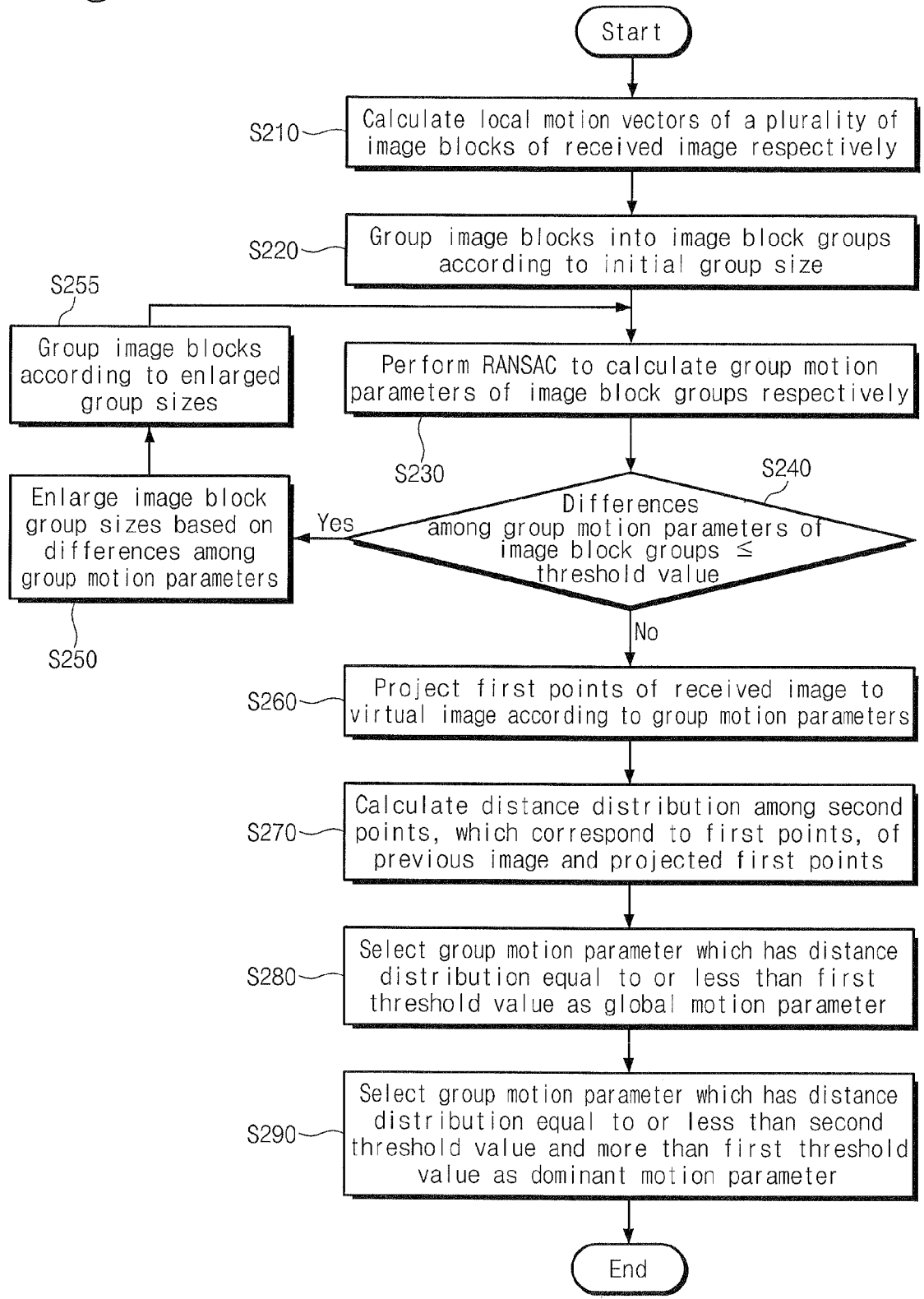
FIG. 3 is a detailed flowchart illustrating the global motion detecting method of FIG. 2.

FIG. 3 is a detailed flowchart illustrating the global motion detecting method in FIG. 2. Referring to FIGS. 1 and 3, in step S210, local motion vectors LMV of plural image blocks in an input image are calculated. The step S210 may be performed by the local motion vector calculator 110.

In step S220, the image blocks are grouped into image block groups according to initial group size information IGS. The step S220 may be performed by the grouping unit 130.

In step S230, group motion parameters of each image block group are calculated through random sample consensus. The step S230 may be carried out by the random sample consensus calculator 140.

In decision step S240, whether the differences between group motion parameters of two image block groups of each pair of image block groups are below a threshold value is judged. If the difference between the group motion parameters of the pair of image block groups is below a threshold value, then in step S250, sizes of the image block groups may be expanded based on the difference between group motion parameters. For example, the determination unit 150 may adjust the group size information GS such that image block groups where a difference between group motion parameters is below the threshold value. Afterwards, the grouping unit 130 may group image block groups according to the group size information GS. The operations S230 to S255 may be repeated (iterated) until the difference between group motion parameter pairs becomes larger than the threshold value.

In decision step S240, if the difference between a group motion parameter pair is larger than the threshold value, then the method proceeds to step S260, in which first points of the input image IM are projected to a virtual image according to the group motion parameters.

In step S270, the distance distribution between second points corresponding to first points at a previous image and the first points projected may be calculated.

In step S280, a group motion parameter having a distance distribution equal to or smaller than a first threshold value may be selected as the basis of the global motion parameter or as the global motion parameter. For example, a group motion parameter equal to or smaller than the first threshold value over a predetermined proportion of the distance distribution may be selected as the basis of the global motion parameter.

In step S290, a group motion parameter having a distance distribution equal to or smaller than a second threshold value and larger than the first threshold value may be selected as the dominant motion parameter. For example, a group motion parameter having a distance distribution smaller than the second threshold value and larger than the first threshold value over a predetermined proportion of the distance distribution may be selected as the dominant motion parameter.

The above-described operations S260 to S290 may be carried out by the determination unit 150.

Figure 4:
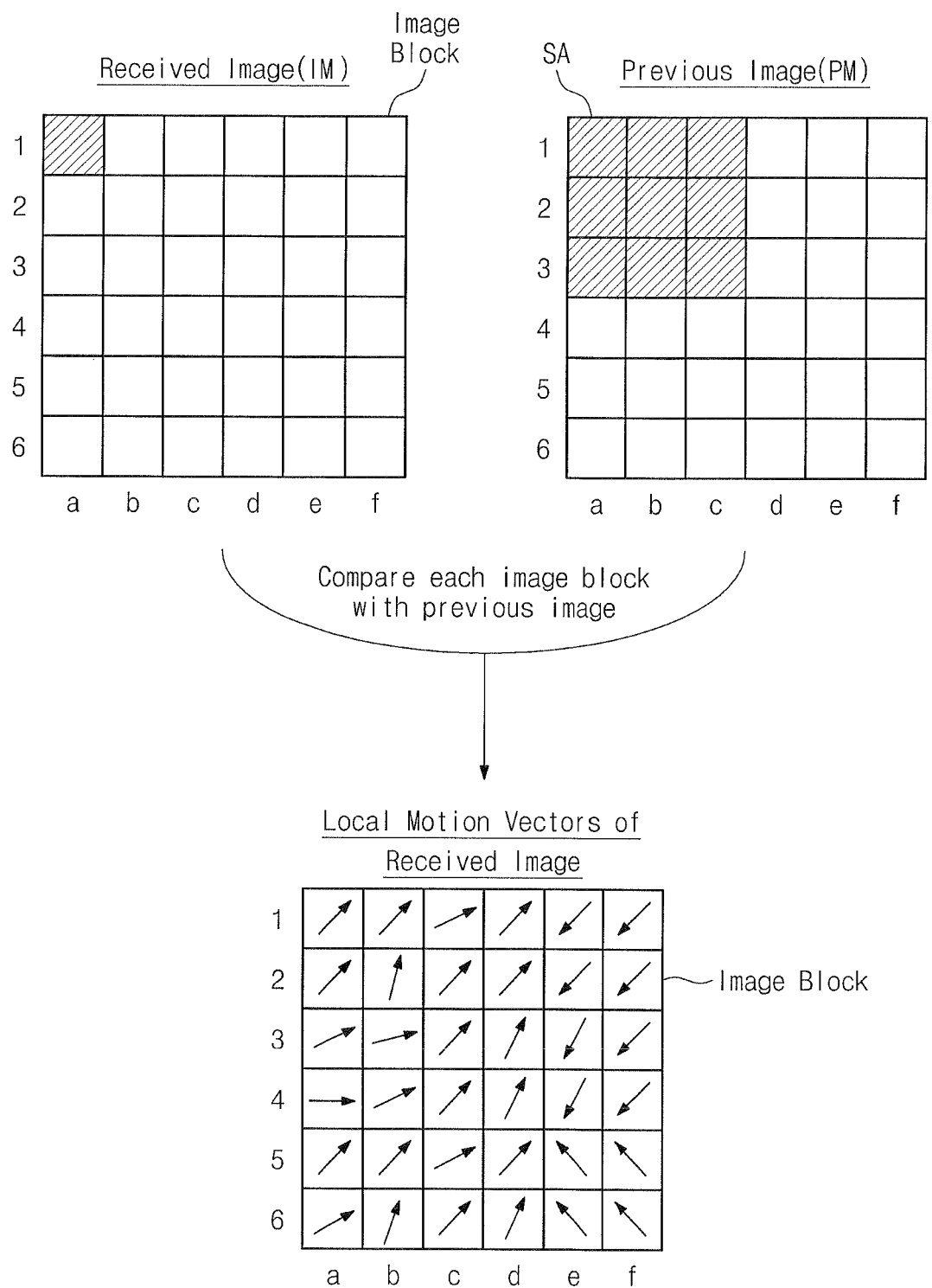
FIG. 4 is a diagram illustrating a method of calculating the local motion vectors of image blocks for the global motion detecting method of FIG. 2.

FIG. 4 is a diagram illustrating a method of calculating the local motion vectors of image blocks for the global motion detecting method of FIG. 2. Referring to FIG. 4, a currently-received input image IM may be divided into a plurality of image blocks. For example, the input image IM may be divided into image blocks arranged in first to sixth rows and 'a' to 'f' columns. The local motion vector LMV of each image block is calculated by comparing the input image 1M and a previous image (PM).

In exemplary embodiments, an example that a local motion vector of an image block at the first row and 'a' column is calculated is illustrated in FIG. 4. The image block at the first row and 'a' column in the input image IM may be compared with a specific area SA of the previous image PM. The specific area SA of the previous image PM preferably includes the image block at the first row and 'a' column, and may have square shape and dimensions corresponding to two or more image blocks.

Similarities may be judged by comparing the image block at the first row and 'a' column of the input image IM with pixels in the specific area SA of the previous image PM. For example, whether a target object captured at an image block at the first row and 'a' column of the input image IM is located at any portion of the specific area SA of the previous image PM may be judged. If the location of the previous image PM where a target object of an image block at the first row and 'a' column of the input image IM is located is judged, whether the image block at the first row and 'a' column of the input image IM has moved from any point of the previous image PM may be judged. The judgment result is the local motion vector LMV of the image block at the first row and 'a' column.

If the above-described steps (comparing and calculating) are performed with respect to all image blocks of the input image IM, the local motion vectors LMV of all image blocks of the input image IM may be calculated.

Figure 5:
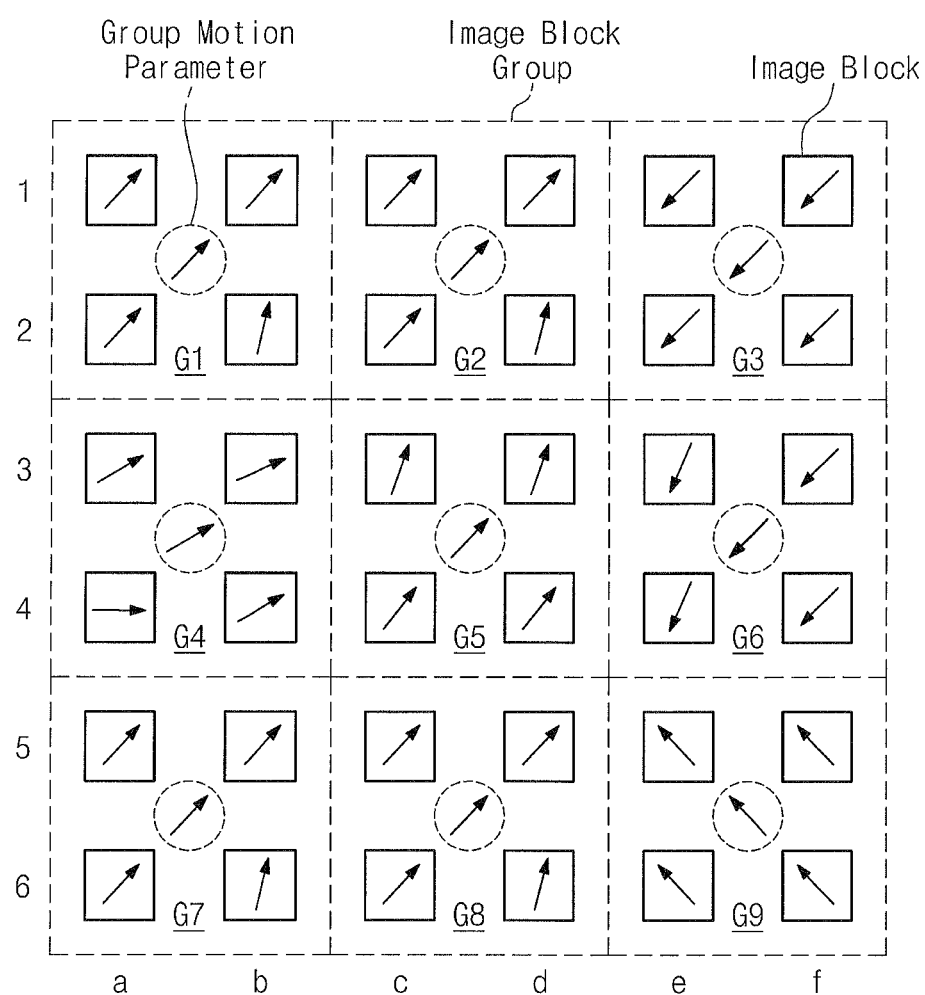
FIG. 5 is a diagram illustrating grouping of image blocks according to an initial group size IGS and group motion parameters.

FIG. 5 is a diagram illustrating the step of grouping image blocks according to an initial group size IGS and group motion parameters. Referring to FIG. 5, an initial group size IGS be four image blocks. Thus, when grouping is made according to the initial group size IGS, four image blocks may form one image block group. Image blocks may be grouped into first to ninth image block groups G1 to G9 as illustrated in FIG. 5.

Each image block group may include a plurality of image blocks. Each of the image blocks in an image block group has a local motion vector LMV. Thus, if grouping is performed, one image block group may include a plurality of local motion vectors LMV.

In each image block group, random sample consensus may be made according to the local motion vectors LMV of the image block group. At this time, group motion parameters of each of the image block groups G1 to G9 may be calculated.

Figure 6:
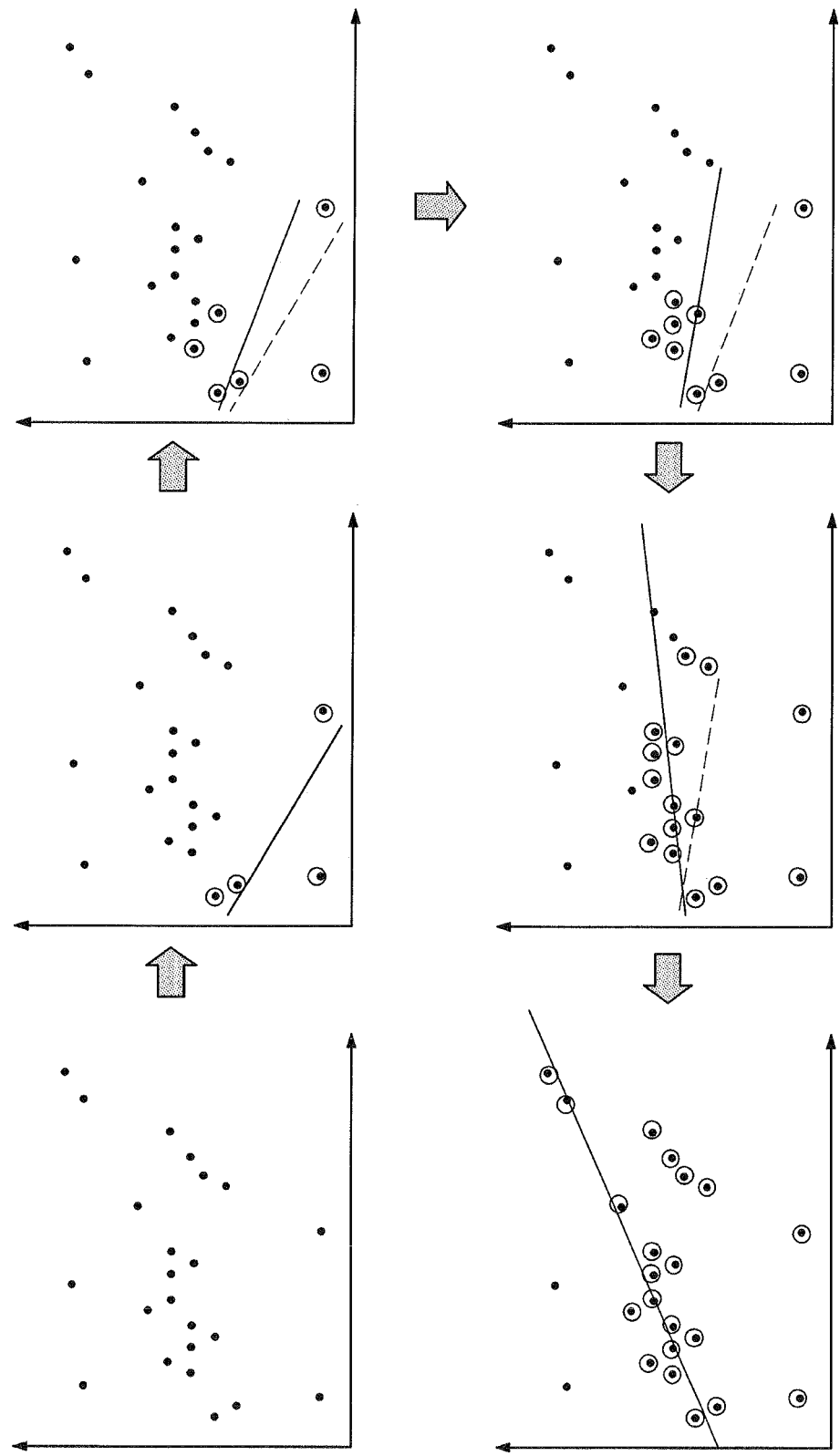
FIG. 6 is a diagram illustrating a random sample consensus operation.

FIG. 6 is a diagram illustrating a random sample consensus operation. In FIG. 6, the horizontal axis indicates the horizontal shift value of each local motion vector VMV, and the vertical axis indicates the vertical shift value of each local motion vector VMV. Points of each graph indicate local motion vectors LMV of image blocks in an image block group.

Local motion vectors LMV of an image block group may include inlier information and outlier information. The outlier information may be generated due to noise, a measurement error, and the like. The random sample consensus may iteratively perform an operation of searching a mathematic model of the inlier information under the assumption that the inlier and outlier information is scattered at samples and the inlier information is particularly determined as a specific mathematic model. In FIG. 6, a dotted line may indicate a mathematic model calculated at a previous step, and a solid line may indicate a mathematic model calculated at a current step.

If the random sample consensus operation is performed, there may be calculated a group motion parameter of local motion vectors, corresponding to the inlier information, from among local motion vectors LMV of each image block group except for a local motion vector corresponding to the inlier information. Thus, the reliability of global motion detection may be improved by revising the inlier information of local motion vectors LMV through grouping and random sample consensus.

In exemplary embodiments, local motion vectors LMV may indicate a movement of an image block on a two-dimensional plane. Group motion parameters may indicate a movement of an image block group in three dimensions. For example, group motion parameters may include measuring information of movement of an image according to PTZ (pan, tilt, zoom) of the camera.

Figure 7:
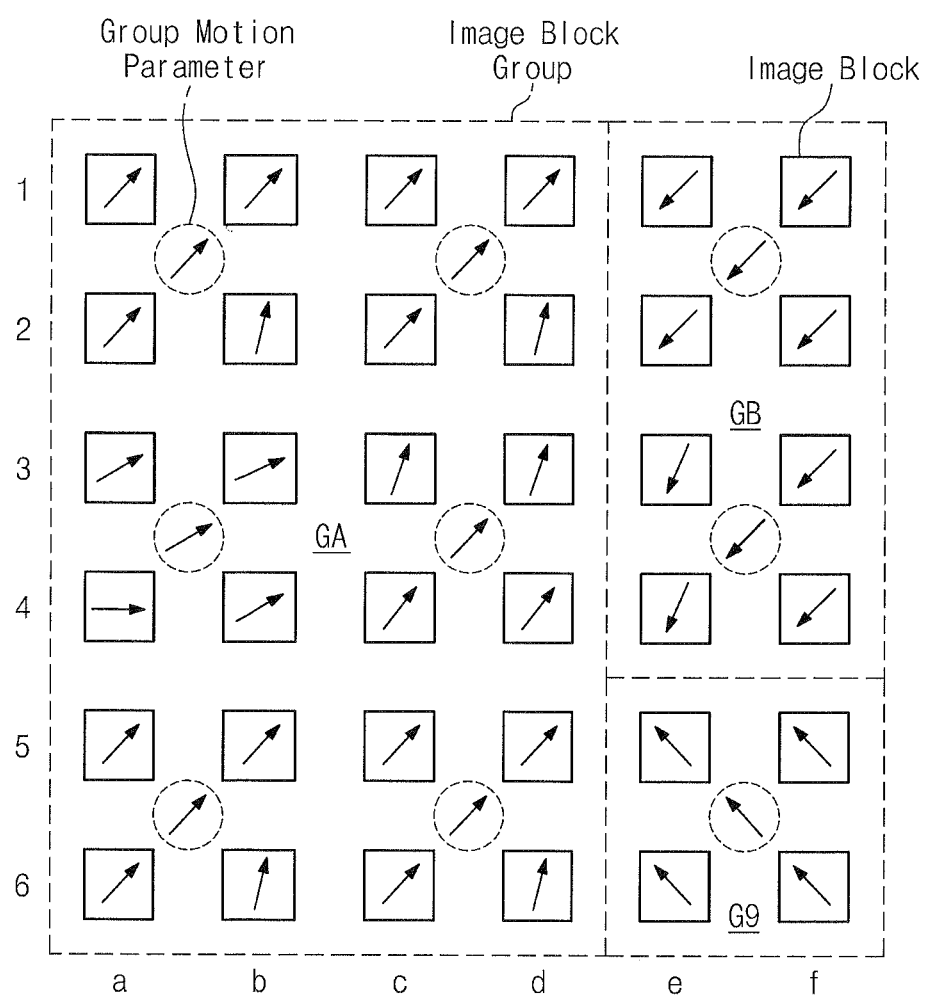
FIG. 7 is a diagram illustrating expansion of image block groups.

FIG. 7 is a diagram illustrating expansion of image block groups. Referring to FIGS. 5 and 7, image block groups G1, G2, G4, G5, G7, and G8 in FIG. 5 have similar group motion parameters (e.g., group motion parameter pairs having a difference below a threshold value). Image block groups G3 and G6 in FIG. 5 have similar group motion parameters (e.g., a pair of group motion parameters having a difference below a threshold value).

Image block groups G1, G2, G4, G5, G7, and G8 have group motion parameters unlike the group motion parameters of image block groups G3 and G6 may (e.g., G1 and G3 have group motion parameters having a difference larger than a threshold value). Image block groups G1, G2, G4, G5, G7, and G8 have group motion parameters unlike the group motion parameters of image block group G9 (e.g., G8 and G9 have group motion parameters having a difference larger than a threshold value). Image block groups G3 and G6 have group motion parameters unlike the group motion parameters of image block group G9 (e.g., G6 and G9 have group motion parameters having a difference larger than a threshold value).

As illustrated in FIG. 7, image block groups G1, G2, G4, G5, G7, and G8 corresponding to group motion parameters having differences below a threshold value may be expanded (grouped) into a single image block group GA. Image block groups G3 and G6 corresponding to group motion parameters having a difference below a threshold value may be expanded into an image block group GB.

Afterwards, the group motion parameter of the image block group GA may be calculated by making random sample consensus based on local motion vectors LMV of the image block group GA. A group motion parameter of the image block group GB may be calculated by making random sample consensus based on local motion vectors LMV of the image block group GB.

Figure 8:
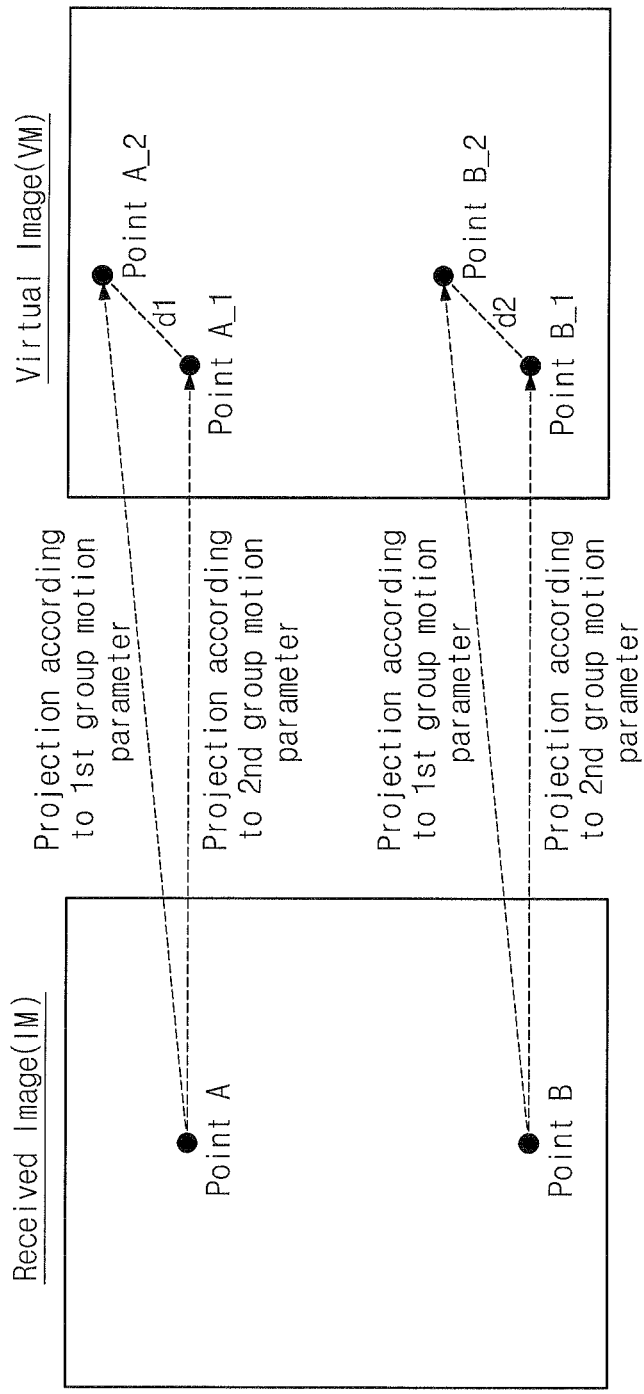
FIG. 8 is a diagram illustrating an example of calculating the difference between group motion parameters.

FIG. 8 is a diagram illustrating an example of calculating the difference between group motion parameters. Referring to FIG. 8, specific each of points A and B of an input image IM may be projected to a virtual image VM according to a first group motion parameter. Each of the specific points A and B of the input image IM may be projected to the virtual image VM according to a second group motion parameter. The difference d1 between a point A_1 projected according to the first group motion parameter and a point A_2 projected according to the second group motion parameter represents the difference between the first and second group motion parameters. The difference d2 between a point B_1 projected according to the first group motion parameter and a point B_2 projected according to the second group motion parameter represents the difference between the first and second group motion parameters. In exemplary embodiments, the difference between the first and second group motion parameters may be expressed by the following equation 1.

$$d(T_i, T_j) = \sqrt{\sum_{n=1}^{N} (T_i[(x_n, y_n)] - T_j[(x_n, y_n)])^2} \quad \text{[Equation 1]}$$

In the Equation 1, $T_i$ and $T_j$ indicate different group motion parameters, and $d(T_i, T_j)$ indicates the distance between different group motion parameters $T_i$ and $T_j$. N indicates the number of specific points A and B of the input image IM, and a point $(x_n, y_n)$ indicates one of the specific points A and B of the input image IM. Functions $T_i()$ and $T_j()$ indicate points on the virtual image VM projected according to different group motion parameters.

With the equation 1, the difference between the first group motion parameter and the second group motion parameter may be expressed by the Equation 2.

$$d(T_i, T_j) = \sqrt{d1^2 + d2^2} \quad \text{[Equation 2]}$$

A new group size may be determined by calculating distances among plural group motion parameters.

Figure 9:
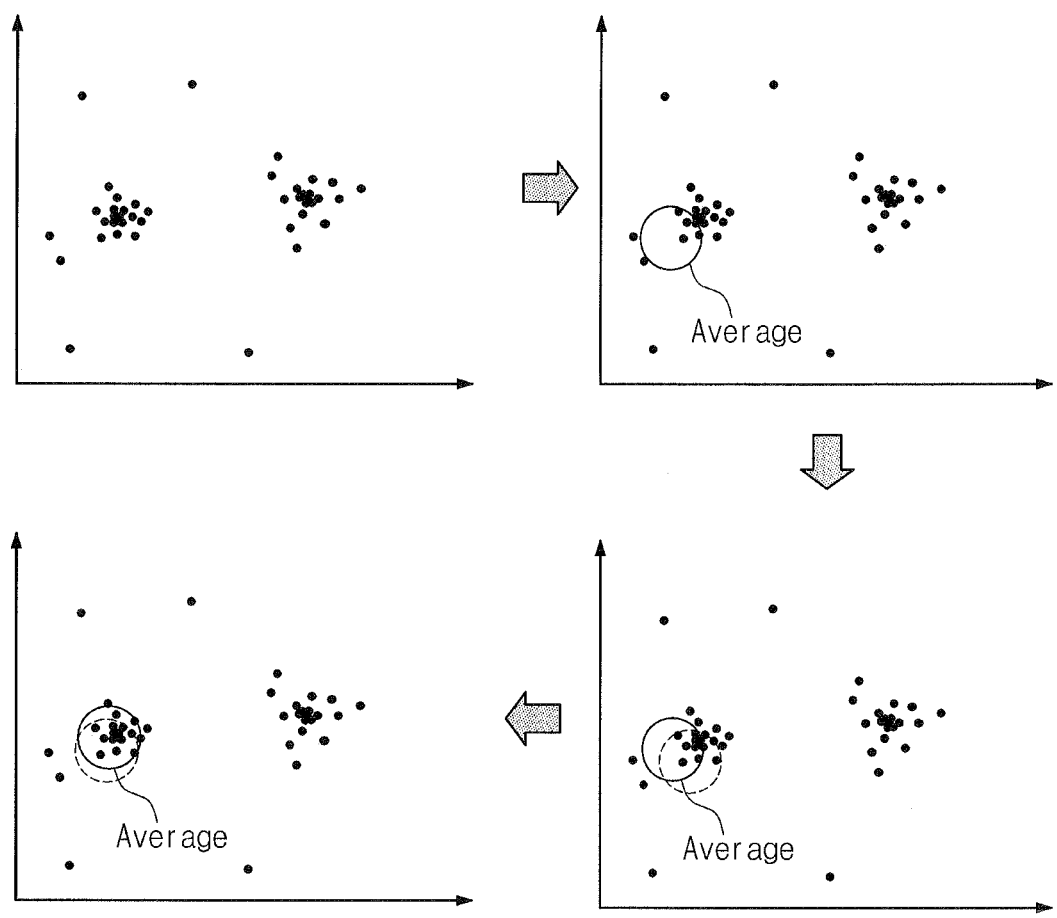
FIG. 9 is a diagram illustrating an example of determining a new group size according to differences among group motion parameters.

FIG. 9 is a diagram illustrating an example of determining a new group size according to differences among group motion parameters. In FIG. 9, the vertical axis and the horizontal indicates a shift value (e.g., a shift value of an image) by group motion parameters. Points of each graph indicate group motion parameters. For ease of description, group motion parameters will be described with reference to a two-dimensional graph. However, a group size GS can be determined at a three or more dimensional graph according to features that group motion parameters have.

In exemplary embodiments, a new group size GS may be determined according to mean shift mode seeking. In FIG. 9, a circle may correspond to a threshold value used to compare similarities between group motion parameters.

First of all, a circle may be determined using centers of points corresponding to group motion parameters. A circular center may be shifted into the center of mass within the determined circle. Shifting of the circular center may be iterated until no circle is shifted. At each graph in FIG. 9, a dotted circle may correspond to a central point calculated at a previous step, and a solid circle corresponds to a central point calculated at a current step. After iterative calculation, group motion parameters placed within a circle may be set to new group motion parameters. Thus, a new group size GS may be determined.

With the above-described mean shift mode seeking, a new group size GS including the maximum number of group motion parameters having similarity may be determined. Thus, the reliability of global motion detection may be improved.

Figure 10:
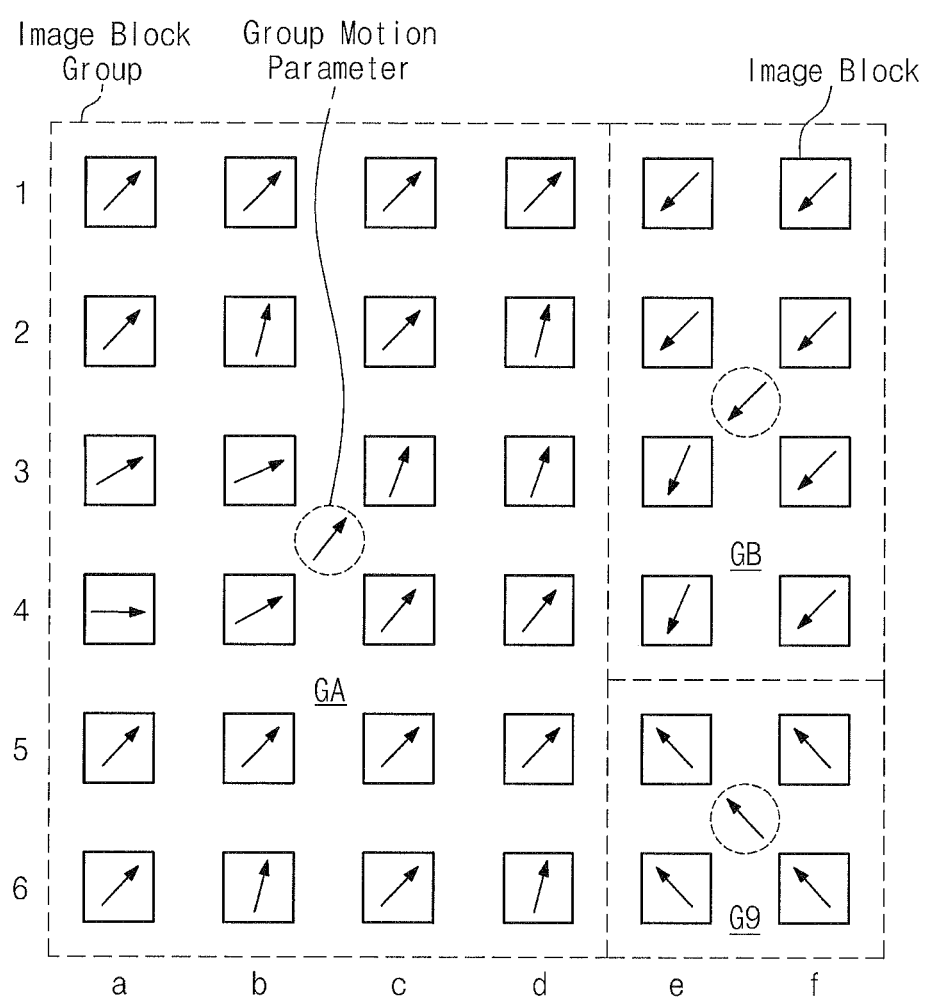
FIG. 10 is a diagram illustrating an example of calculating group motion parameters at expanded image block groups.

FIG. 10 is a diagram illustrating an example of calculating group motion parameters at expanded image block groups. Referring to FIGS. 7 and 10, a first group motion parameter may be calculated based on the local motion vectors LMV of image blocks of an expanded image block group GA. The group motion parameter may be calculated according to random sample consensus. Likewise, a second group motion parameter may be calculated based on the local motion vectors LMV of image blocks of an expanded image block group GB.

In exemplary embodiments, differences among group motion parameters of image block groups GA, GB, and G9 are larger than a threshold value. Thus, the image block groups GA, GB, and G9 may not be expanded any more. At this time, iteration of expanding of image block groups and calculating of group motion parameters may be ended. Upon comparing with a previous image PM, an input image IM may be judged to have meaningful movement corresponding to three image block groups GA, GB, and G9. Movement corresponding to three image block groups GA, GB, and G9 may include intentional movement and jitter motion of the camera capturing an image, movement of a target object captured by a camera, and the like.

The global motion parameter of the input image IM may be obtained or selected by selecting one of the group motion parameters corresponding to movement of a camera, from among the group motion parameters. If the global motion parameter contains only vector information (translational information), it may be equal to the selected one of the group motion parameters. If the global motion parameter contains rotational information in addition to translational information, its translational information may be equal to the selected one of the group motion parameters.

Figure 11:
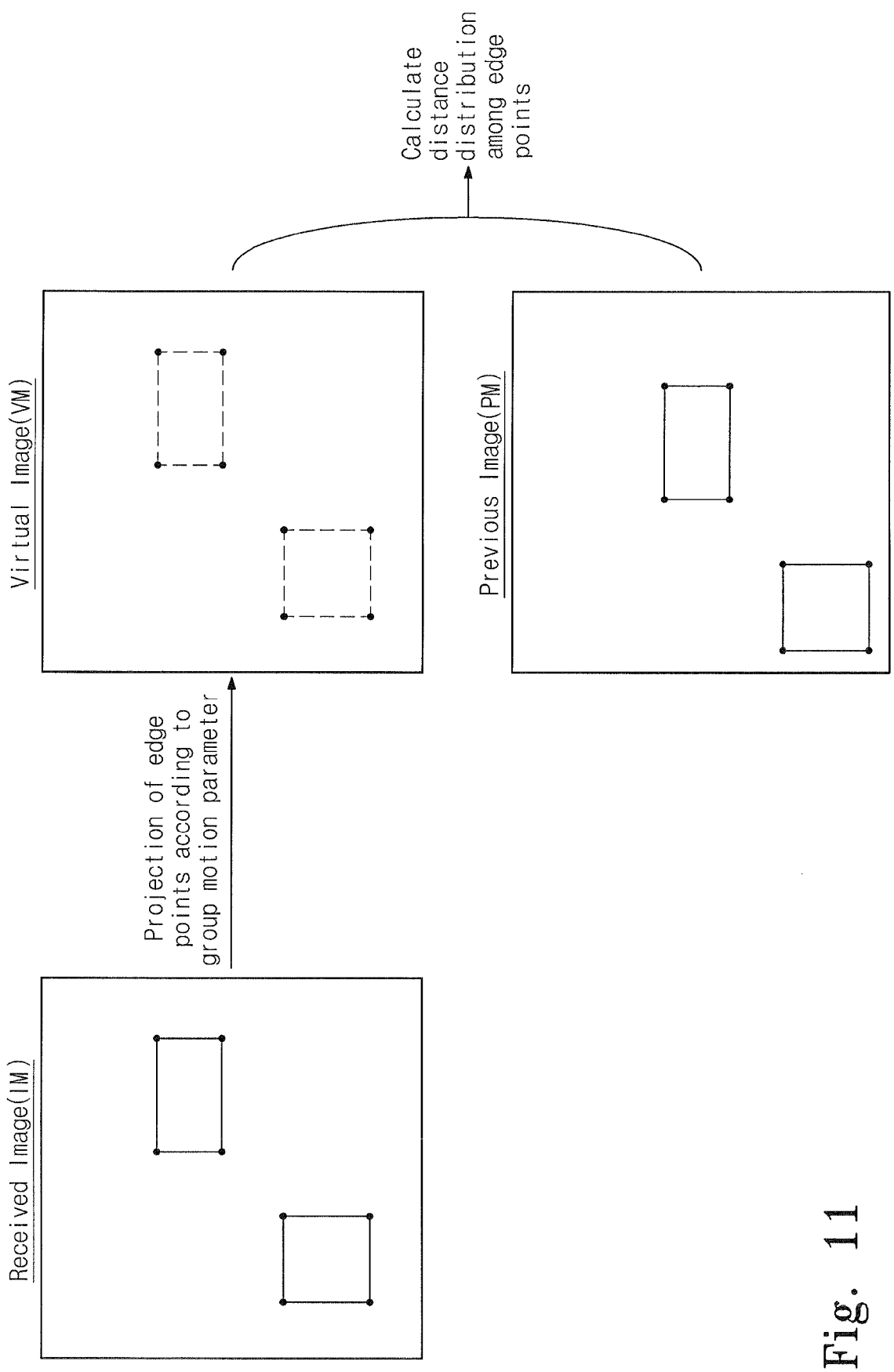
FIG. 11 is a diagram illustrating an example that the global motion parameter of group motion parameter is selected.

FIG. 11 is a diagram illustrating an example of selecting the global motion parameter from among the group motion parameters. Referring to FIG. 11, feature points may be detected from an input image IM. The feature points may indicate edges between target objects in an image or between a target object and a background. Points having a significant variation in hue, saturation, or intensity may be detected as edges.

The detected feature points may be projected to a virtual image VM according to a group motion parameter. For example, feature points may be projected onto the virtual image VM according to one group motion parameter, among group motion parameters, having a difference larger than a threshold value.

Feature points from the previous image PM and corresponding to feature points of the input image IM may be detected.

A distance distribution between feature points of the previous image PM and feature points of the virtual image VM may be calculated. A location shift of feature points between the previous image PM and the input image IM may indicate how much it corresponds to a group motion parameter. The distance distribution may be detected with respect to each of the group motion parameters having a difference larger than a threshold value.

The global motion parameter may be selected based on distance distributions of group motion parameters. For example, a group motion parameter the distance distribution of which is below a first threshold value over a specific rate (e.g., 95%) may be selected as the global motion parameter. Thus, a group motion parameter that movement of feature points over 95% has an error below the first threshold value may be selected as the global motion parameter GMP. The global motion parameter GMP may be judged to indicate movement of a camera capturing an image.

A group motion parameter the distance distribution of which is over a first threshold value over a specific rate (e.g., 95%) and below a second threshold value may be selected as the dominant motion parameter. Thus, a group motion parameter that movement of feature points over 95% has an error larger than the first threshold value and lower than the second threshold value may be selected as the dominant motion parameter.

With the inventive concept, expanding of image block groups and calculating of group motion parameters may be iterated. In this case, outlier information may be excluded from calculating of group motion parameters. Thus, it is possible to provide a global motion detector having improved reliability and operating speed and a global motion detecting method thereof.

According to an embodiment of the inventive concept, global motion parameters and dominant motion parameters may be selected from group motion parameters. It is possible to measure movement of a camera capturing the received input image according to the global motion parameter and to measure the movement of a dominant target object within an image according to the dominant motion parameter.

Figure 12:
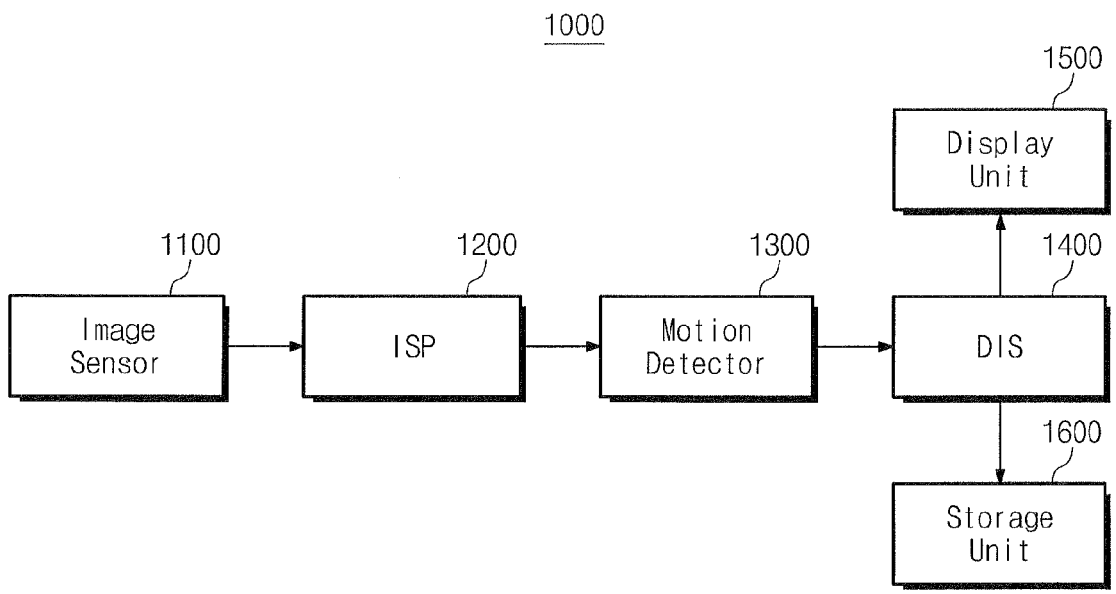
FIG. 12 is a block diagram schematically illustrating an image capturing device according to an embodiment of the inventive concept.

FIG. 12 is a block diagram schematically illustrating an image capturing device according to an exemplary embodiment of the inventive concept. Referring to FIG. 12, an image capturing device 1000 may include an image sensor 1100, an image signal processor 1200, a global motion detector 1300, a digital image stabilizer 1400, a display unit 1500, and a storage unit 1600.

The image sensor 1100 may capture images of the external environment to be output as a video image sequence. The image sensor 1100 may include a charge couple device (CCD), a CMOS image sensor (CIS), and the like.

The image signal processor 1200 may process an image captured by the image sensor 1100. For example, the image signal processor 1200 may convert a Bayer image captured by the image sensor 1100 into an RGB or YUV image.

The global motion detector 1300 may detect motion from a video sequence of images processed by the image signal processor 1200. For example, the global motion detector 1300 may include or be implemented as the global motion detector 100 of FIG. 1. The global motion detector 1300 may obtain global motion parameters from a video image sequence processed by the image signal processor 1200.

The digital image stabilizer 1400 may perform digital image stabilization based on the global motion parameters detected by the global motion detector 1300. For example, the digital image stabilizer 1400 may judge the global motion parameters detected by the global motion detector 1300 to be or to include a jitter noise due to vibration. The digital image stabilizer 1400 may compensate for movement judged to be a noise, and may display a smoothened result via the display unit 1500 or store it at the storage unit 1600.

In exemplary embodiments, the image capturing device 1000 may be a mobile device having an image capturing function. The image capturing device 1000 may include a smartphone, a smart pad, a digital camera, a digital camcorder, and the like.

Figure 13:
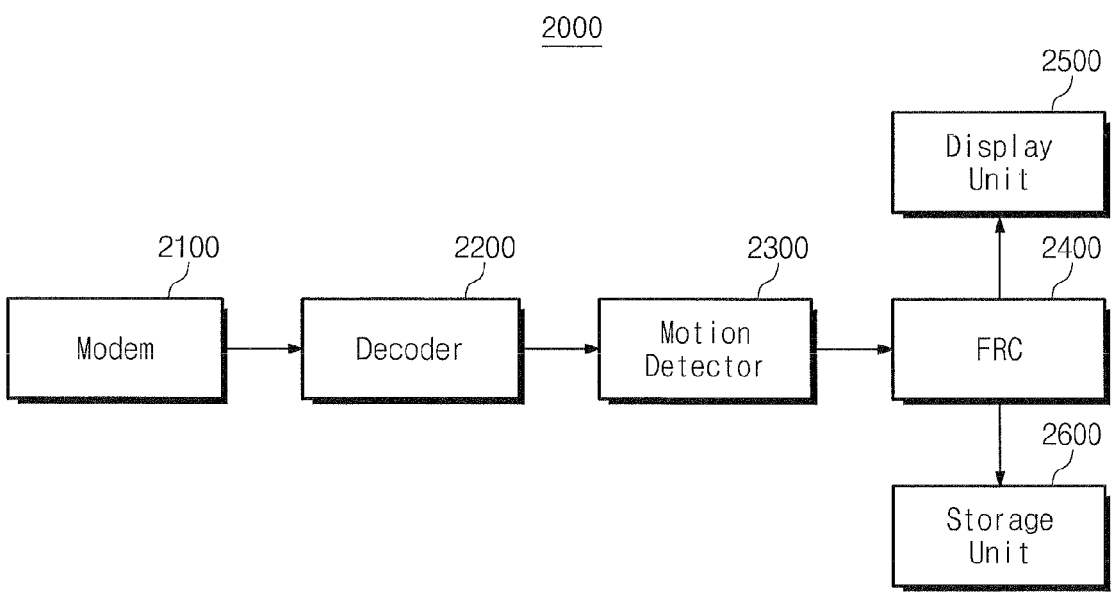
FIG. 13 is a block diagram schematically illustrating an image display device according to an embodiment of the inventive concept.

FIG. 13 is a block diagram schematically illustrating an image display device according to an embodiment of the inventive concept. Referring to FIG. 13, an image display device 2000 may include a modem 2100, a decoder 2200, a global motion detector 2300, a frame rate converter 2400, a display unit 2500, and a storage unit 2600.

The modem 2100 may receive an image from an external device via wired or wireless communication.

The decoder 2200 decodes the image input via the modem 2100. For example, compression and security of the image may be reversed by the decoder 2200.

The global motion detector 2300 may detect motion from the decoded image. For example, the global motion detector 2300 may include a global motion detector 100 described with reference to FIG. 1. The global motion detector 2300 may detect the global motion parameter or global and dominant motion parameters from the decoded image.

The frame rate converter 2400 may perform frame rate conversion based on the global motion parameters or the global and dominant motion parameters. For example, an image input via the modem 2100 may be an image having 30 frames per second. The frame rate converter 2400 may increase a frame rate of the input image based on the global motion parameters or the global and dominant motion parameters. The frame rate converter 2400 may convert a frame rate of the input image into 240 frames per second.

The global motion parameter preferably indicates directionality of (translational) movement of a whole image and may additionally indicate rotational movement of the whole image. A dominant motion parameter may indicate directionality of (translational) movement of a target object in an image. If the global motion parameter and the dominant motion parameter are obtained, the frame rate converter 2400 may generate intermediate frames having improved connection. In this case, connection of a whole image the frame rate of which is converted may be improved.

An image the frame rate of which is converted by the frame rate converter 2400 may be displayed via the display unit 2500 or stored at the storage unit 2600.

In exemplary embodiments, the image display device 2000 may be a mobile or non-portable device having an image display function. The image display device 2000 may include a smartphone, a smart pad, a digital camera, a digital camcorder, a smart television, and the like.

Figure 14:
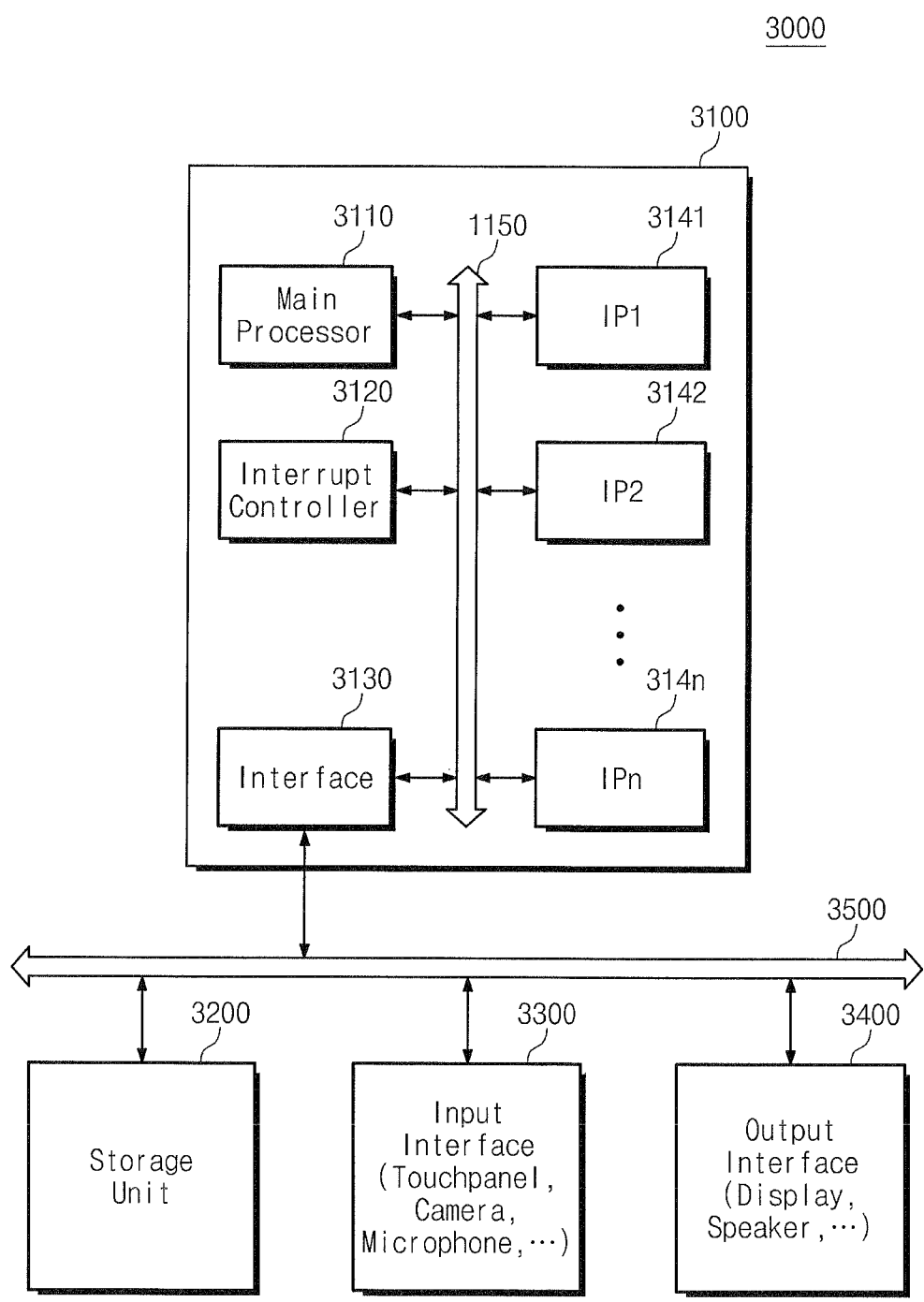
FIG. 14 is a block diagram schematically illustrating a multimedia device according to an embodiment of the inventive concept.

FIG. 14 is a block diagram schematically illustrating a multimedia device according to an exemplary embodiment of the inventive concept. Referring to FIG. 14, a multimedia device 3000 may include an application processor 3100, a storage unit 3200, an input interface 3300, an output interface 3400, and a bus 3500.

The application processor 3100 may be configured to control an overall operation of the multimedia device 3000. The application processor 3100 may be implemented as a system-on-chip.

The application processor 3100 may include a main processor 3110, an interrupt controller 3120, an interface 3130, a plurality of application specific intellectual property (IP) blocks 3141 to 314 n, and an internal bus 3150.

The main processor 3110 may be a core of the application processor 3100. The interrupt controller 3120 manages interrupts generated within the application processor 3100 to report them to the main processor 3110.

The interface 3130 relays communications between the application processor 3100 and external elements. The interface 3130 relays communications such that the application processor 3100 can control external elements. The interface 3130 may include an interface for controlling the storage unit 3200, an interface for controlling the input and output interfaces 3300 and 3400, and the like. The interface 3130 may include JTAG (Joint Test Action Group) interface, TIC (Test Interface Controller) interface, memory interface, IDE (Integrated Drive Electronics) interface, USB (Universal Serial Bus) interface, SPI (Serial Peripheral Interface), audio interface, video interface, and the like.

The IP blocks 3141 to 314 n may perform specific functions, respectively. For example, the IP blocks 3141 to 314 n may include an internal memory, a global motion detector 100 (refer to FIG. 1), an image signal processor 1200 (refer to FIG. 12), a digital image stabilizer 1400 (refer to FIG. 12), a modem 2100 (refer to FIG. 13), a decoder 2200 (refer to FIG. 13), a frame rate converter 2400 (refer to FIG. 13), a graphic processing unit (GPU), a sound controller, a security module, and the like.

The internal bus 3150 may provide a channel among internal elements of the application processor 3100. For example, the internal bus 3150 may include an AMBA (Advanced Microcontroller Bus Architecture) bus. The internal bus 3150 may include AMBA AHB (Advanced High Performance Bus) or AMBA APB (Advanced Peripheral Bus).

The storage unit 3200 may be configured to communicate with other elements of the multimedia device 3000 via the bus 3500. The storage unit 3200 may store data processed by the application processor 3100.

The input interface 3300 may include various devices for receiving signals from an external device. The input interface 1300 may include a keyboard, a key pad, a button, a touch panel, a touch screen, a touch ball, a touch pad, a camera including an image sensor1100 (refer to FIG. 12), a microphone, a gyroscope sensor, a vibration sensor, a data port for wire input, an antenna for wireless input, and the like.

The output interface 3400 may include various devices for outputting signals to an external device. The output interface 3400 may include interfaces for an LCD, an OLED (Organic Light Emitting Diode) display device, an AMOLED (Active Matrix OLED) display device, an LED, a speaker, a motor, a data port for wire output, an antenna for wireless output, and the like.

The multimedia device 3000 may include a mobile multimedia device such as a smart phone, a smart pad, a digital camera, a digital camcorder, a notebook computer, and the like or a non-portable multimedia device such as a smart television, a desktop computer, and the like.

With the inventive concept, image blocks may be grouped into a plurality of image block groups, the sizes of the image block groups may iteratively increase, and the group motion parameters of the image block groups may be calculated iteratively. The global motion parameter may be selected from among the iteratively calculated group motion parameters. Thus, it is possible to provide a global motion detector having improved reliability and operating speed and a global motion detecting method thereof.

While the inventive concept has been described with reference to exemplary embodiments, it will be apparent to those skilled in the art that various changes and modifications may be made without departing from the spirit and scope of the present inventive concept. Therefore, it should be understood that the above embodiments are not limiting, but illustrative.

What is claimed is:

1. A global motion detecting method comprising:
receiving a video sequence of input images;
calculating local motion vectors, one for each image block of a current input image;
grouping image blocks of the current input image into image block groups based on local motion vectors of the image block groups;
calculating a group motion parameter of each image block group among the image block groups based on the local motion vectors of its respective image blocks; and
determining a global motion parameter of the current input image based on a selected one of group motion parameters of the image block groups,
wherein the grouping image blocks into image block groups comprises grouping the image blocks into the image block groups having the same size according to predetermined group size information.

2. The global motion detecting method of claim 1, wherein the group motion parameters of the image block groups are calculated by performing random sample consensus based on local motion vectors of the image blocks in the respective image block groups.

3. The global motion detecting method of claim 1, wherein the determining the global motion parameter of the current input image comprises:
iteratively judging whether differences between the group motion parameters of each pair of image block groups are larger than a threshold value, and
if a difference between two group motion parameters of the two image block groups of the pair is smaller than the threshold value, then expanding a size of an image block group such that image block groups having a difference between their group motion parameters below the threshold value are grouped into one expanded image block group, and calculating a group motion parameter of the expanded image block group; and
if a difference between the group motion parameters of the two image block groups of the pair is larger than the threshold value, then selecting the global motion parameter based on selecting one group motion parameter from among the group motion parameters of the image block groups.

4. The global motion detecting method of claim 3, wherein the iteratively judging whether differences between the group motion parameters of each pair of image block groups are larger than a threshold value comprises:
projecting a specific point of the current input image onto a virtual image according to each of the two group motion parameters respectively; and
comparing the distance between two specific points that are respectively projected onto the virtual image according to the two group motion parameters, with the threshold value.

5. The global motion detecting method of claim 4, wherein the expanding of sizes of the image block groups is performed according to mean shift mode seeking.

6. The global motion detecting method of claim 3, wherein the selecting the global motion parameter based on selecting one group motion parameter from among the group motion parameters comprises:
projecting first feature points of the current input image onto a virtual image according to the group motion parameters respectively;
calculating a distance distribution between second points of a previous image input prior to the current input image, which correspond to the first feature points respectively, and the first points projected onto the virtual image; and
selecting a group motion parameter where a distribution of the calculated distance distribution over a first rate is below a first threshold value, as the global motion parameter.

7. The global motion detecting method of claim 6, wherein the first rate is 95%.

8. The global motion detecting method of claim 6, further comprising:
selecting a dominant motion parameter from among the group motion vectors of the image block groups if the difference between the group motion parameters of the image block groups is larger than the threshold value.

9. The global motion detecting method of claim 8, wherein the selecting a dominant motion parameter comprises:
selecting a group motion parameter where a distribution of the calculated distance distribution over the first rate is larger than the first threshold value and smaller than a second threshold value, as the dominant motion parameter.

10. The global motion detecting method of claim 1, further comprising:
detecting a jitter noise motion component of the global motion parameter for performing digital image stabilization of the input image based on the determined global motion parameter.

11. The global motion detecting method of claim 1, further comprising:
detecting a Pan-Tilt-Zoom (PTZ) component of the global motion parameter for performing frame rate conversion of the input image based on the determined global motion parameter.

12. A global motion detector circuit comprising:
a local motion vector calculator configured to calculate the local motion vector of each image block of an input image;
a grouping unit configured to group the image blocks into image block groups;
an initial group size register configured to provide an initial size of the image block groups to the grouping unit;
a random sample consensus calculator configured to calculate a group motion parameter of each of the image block groups based on the local motion vectors of its image block groups; and
a determination unit configured to determine the global motion parameter based on the group motion parameters,
wherein if a difference between two of the group motion parameters among pairs of the group motion parameters is below a threshold value, the determination unit provides the grouping unit with new group size information for including image block groups corresponding to group motion parameters having a difference smaller than the threshold value,
wherein the grouping unit regroups the image blocks into expanded image block groups in response to the new group size information, and
wherein the random sample consensus calculator recalculates group motion parameters of the expanded image block groups.

13. The global motion detector circuit of claim 12, wherein if a difference between the two group motion parameters among pairs of the group motion parameters is larger than a threshold value, the determination unit projects feature points of the input image onto a virtual image according to each of the two group motion parameters respectively, calculates a distance distribution between feature points of a previous image input prior to the input image and the feature points projected onto the virtual image, and selects a group motion parameter where a specific rate of the distance distribution is below a first threshold value, as the basis for the global motion parameter of the input image.

14. A digital image stabilization (DIS) method for stabilizing a video image sequence, comprising:
   receiving a video sequence of input images; and
   performing a global motion parameter detecting method, wherein the global motion parameter detecting method comprises:
      calculating a local motion vector of each image block of a current input image;
      grouping image blocks of the current input image into image block groups based on local motion vectors of the image block groups;
      calculating a group motion parameter of each image block group among the image block groups based on the local motion vectors of its respective image blocks; and
      determining a global motion parameter of the current input image based on a selected one of group motion parameters of the image block groups,
   wherein the grouping the image blocks into image block groups comprises iteratively expanding the image block groups to include adjacent image block groups of an initial group size, based on whether differences between two group motion parameters of each pair of image block groups is larger than a threshold value.

15. The digital image stabilization (DIS) method of claim 14, wherein the grouping the image blocks into image block groups further comprises:
   initially grouping the image blocks into image block groups having the same size according to predetermined initial group size information.

16. The digital image stabilization (DIS) method of claim 14, wherein the iteratively expanding image block groups comprises:
   iteratively judging whether differences between the group motion parameters of each pair of image block groups are larger than a threshold value, and
   if a difference between the group motion parameters of the two image block groups of the pair is smaller than the threshold value, then expanding a size of an image block group such that image block groups having a difference between their group motion parameters below the threshold value are grouped into one expanded image block group, and calculating the group motion parameter of the expanded image block group.

17. The digital image stabilization (DIS) method of claim 14, wherein the iteratively expanding image block groups further comprises:
   if a difference between the group motion parameters of the two image block groups of the pair is larger than the threshold value, then selecting one group motion parameter from among the group motion parameters of the expanded image block groups as the basis of the global motion parameter.

18. The global motion detecting method of claim 4, wherein the expanding of the image block groups is performed according to mean shift mode seeking.

* * * * *